United States Patent
Harneit

(10) Patent No.: US 6,779,519 B2
(45) Date of Patent: Aug. 24, 2004

(54) COVER SHEET FOR ROTISSERIE BURNERS

(76) Inventor: Uwe Harneit, 1466 West Francis Ave., Ontario, CA (US) 91762-6016

(*) Notice: Subject to any disclaimer, the term of this patent is extended or adjusted under 35 U.S.C. 154(b) by 0 days.

(21) Appl. No.: 10/242,211

(22) Filed: Sep. 11, 2002

(65) Prior Publication Data

US 2003/0056781 A1 Mar. 27, 2003

Related U.S. Application Data

(60) Provisional application No. 60/324,219, filed on Sep. 22, 2001.

(51) Int. Cl.[7] ................................................. F23C 3/08
(52) U.S. Cl. ............... 126/41 R; 126/39 J; 126/92 AC; 431/326
(58) Field of Search .......................... 126/41 RG, 41 A, 126/41 B, 39 B, 39 L, 39 JA, 92 A; 431/326, 329

(56) References Cited

U.S. PATENT DOCUMENTS

| | | | |
|---|---|---|---|
| 4,089,258 A | * | 5/1978 | Berger .......................... 99/339 |
| 4,321,857 A | | 3/1982 | Best |
| 4,886,044 A | | 12/1989 | Best |
| 5,127,392 A | * | 7/1992 | Mizuno et al. ............ 126/92 R |
| 5,195,425 A | * | 3/1993 | Koziol ....................... 99/421 H |
| 5,816,235 A | | 10/1998 | Kim et al. |
| 6,012,444 A | * | 1/2000 | Skender ..................... 126/41 R |
| 6,114,666 A | | 9/2000 | Best |

* cited by examiner

Primary Examiner—Alfred Basichas
(74) Attorney, Agent, or Firm—Lewis M. Brande; Thomas A. McCleary; Brande and McCleary

(57) ABSTRACT

A Infrared or mesh burner having a flat sheet (or cover sheet) of heat resistant glass or metal is positioned between the food to be cooked and the mesh burner. The cover sheet is held in position with brackets that have grooves that allow the cover sheet to be frictionally held in position in a generally vertical position. The brackets can have the ability to allow the cover sheet to be rotationally positioned providing a more directed heat source.

3 Claims, 4 Drawing Sheets

COVER SHEET FOR ROTISSERIE BURNERS

This claims the benefit of provisional application 60/324,219 filed on Sep. 22, 2001.

BACKGROUND OF THE INVENTION

Field of the Invention

Many gas barbeque grills have a type of burner called an IR (Infrared) burner or mesh burner. This type of burner is different from the typical burner in that it is not of circular or oblong geometry with flames propagating from the sides. This type of burner is generally a box shaped structure, where the front is a honeycomb matrix of very small diameter holes. The honeycomb matrix is generally of a complex design since the flames that propagate from the holes are small. There are generally grooves carved into the honeycomb matrix to allow additional air to support the flames.

The IR (Infrared) or mesh burner may be mounted either in the rear or top of an outdoor grill or a conventional home oven. When mounted in this way, the problems that are presented become apparent. When cooking foods such as steaks and chicken, it is normal for the food to splatter grease and other particulate matter in all directions. The other surfaces of the grill or oven are either of the self cleaning type, or may have some form of oven cleaner applied in order to maintain the cleanliness of the grill or oven.

The surfaces of the grill or oven are typically very smooth, so the use of any type of chemical cleaner will not adversely affect the finishes of the grill or oven (excepting self cleaning ovens). The surface of the IR burner is substantially different. The matrix of holes previously described are small, typically approximately. 7 mm (0.030 inch) in diameter. Should any grease and particulate matter splatter onto the face of the IR or mesh burner, it is very likely to clog some of the holes. The use of a chemical cleaner would very likely have the affect of further clogging the holes, which then would result in loss of efficiency of the IR or mesh burner. Scrubbing the surface of the IR burner would damage the burner grid as the material that comprises the matrix is very soft. A wire brush, or even a scrubbing cloth may easily damage the surface of the grid, permanently damaging the hole pattern, which again causes a loss of heating efficiency. The use of a wire to unclog the holes, again would have a detrimental effect on the holes. The hole walls would be scratched or penetrated by the wire, damaging the matrix.

The purpose of this invention is to substantially reduce the damage to the hole matrix of the IR mesh burners.

SUMMARY OF THE INVENTION

The following description is provided to enable a person skilled in the art to make and use the invention and sets forth the best modes contemplated by the inventor for carrying out his invention. Various modifications, however, will be readily apparent to those skilled in the art, since the generic principles of the present invention have been defined herein specifically to provide for an improved protection for an Infra-red burner grid.

The object of this invention is to create a shield that would be placed between the cooking food and the IR or mesh burner in order to prevent the splatter of grease and particulate matter, which might clog the hole matrix of the IR or mesh burner.

A further object of this invention is to create a radiating surface that would provide even heating of the cooking food.

The objects of this invention are achieved by attaching support structure to the grill or oven. Mounted within the support structure would be a heat resistant transparent material. The width of the transparency would be large enough to prevent any direct splatter from impacting and therefore clogging the IR or mesh burner's hole matrix, while the length would generally span the length of the grill's or oven's internal cavity.

DESCRIPTION OF THE PRIOR ART

U.S. Pat. No. 6,114,666 by Best discloses a HEATING ASSEMBLY AND COOKING APPARATUS. A heat radiating plate is a component of a heating assembly and is shown mounted horizontally, radiating heat upwards towards the food. A flammable gas/air mixture penetrates through the burner plates creating a flame front on the upper surface of the burner plates. The heat radiating plate is spaced above the flame front and absorbs heat from the flame front on it's lower surface, which it radiates on it's upper surface to cook food. In this invention, the burners are directly below the food. When the food is cooked, drippings from the food will fall on the burners, thus clogging the burners. The purpose of U.S. Pat. No. 6,114,666 prevents the under-fired burner from failing because of water or drippings clogging the burners. The applicant's invention differs in that the cover sheet is vertical and may also be reoriented to any position in a 120 degree arc, whereas U.S. Pat. No. 6,114,666 is fixed in a horizontal position resting on top of the burner assembly. Also, the food cooked on the applicant's grill will allow food drippings to fall away from the burner assembly, whereas in U.S. Pat. No. 6,114,666 the drippings will fall into the burner assembly, as noted above.

U.S. Pat. No. 5,816,235 by Kim et al. shows an INFRARED GAS BURNER FOR GAS COOKERS. This unit is designed to deliver infrared radiation to a cooking pot by means of a ceramic plate that is heated by flames from a burner unit. The cover plate is designed to hold only pots and pans on a burner plate, thus preventing damage to the ceramic burner. The current invention is designed to cook a wide variety of foods in a barbeque.

U.S. Pat. No. 4,886,044 by Best discloses an INFRARED GAS GRILL. This invention has a plenum that contains a perforated sheet metal plate that acts as a gas air mixture baffle. A set of burner elements provide a flame front on their upper surfaces. This invention has a grease shield and radiant deflector assembly that contains a series of generally "L" or "V" shaped emitters that have flanges to capture grease. These emitters are attached onto a pair of rails. Although this assembly generally captures grease and provides a surface to emit radiant energy, it is highly complex and generally more difficult to clean than a simple flat plate.

BRIEF DESCRIPTION OF THE DRAWINGS

The objects and features of the present invention, which are believed to be novel, are set forth with particularity in the claims. The present invention, both as to its organization and manner of operation, together with further objects and advantages, may be best understood by reference to the following description, taken in connection with the accompanying drawings, in which:

DETAILED DESCRIPTION

Figure 1:
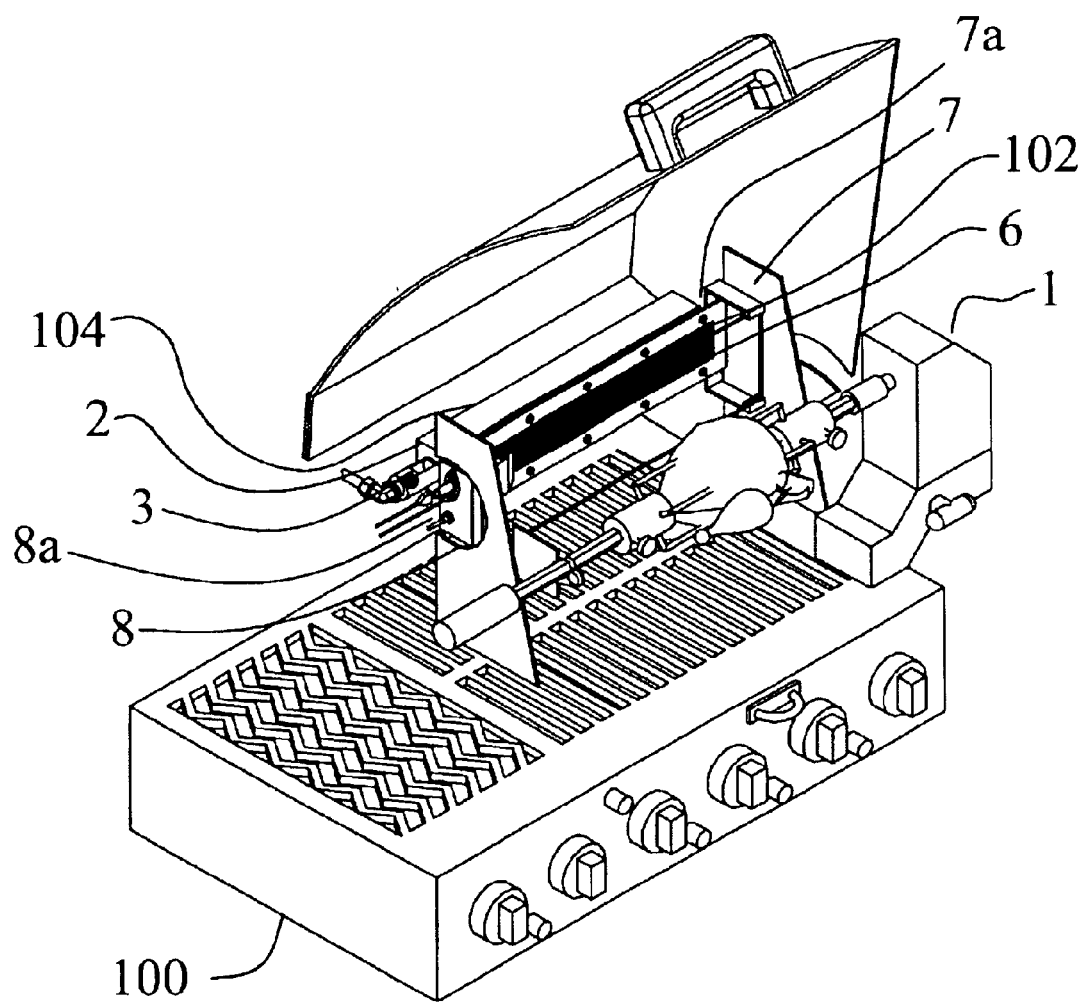
FIG. 1 shows an overall view of a barbeque grill that has an IR burner and a cover sheet attached
Figure 2:
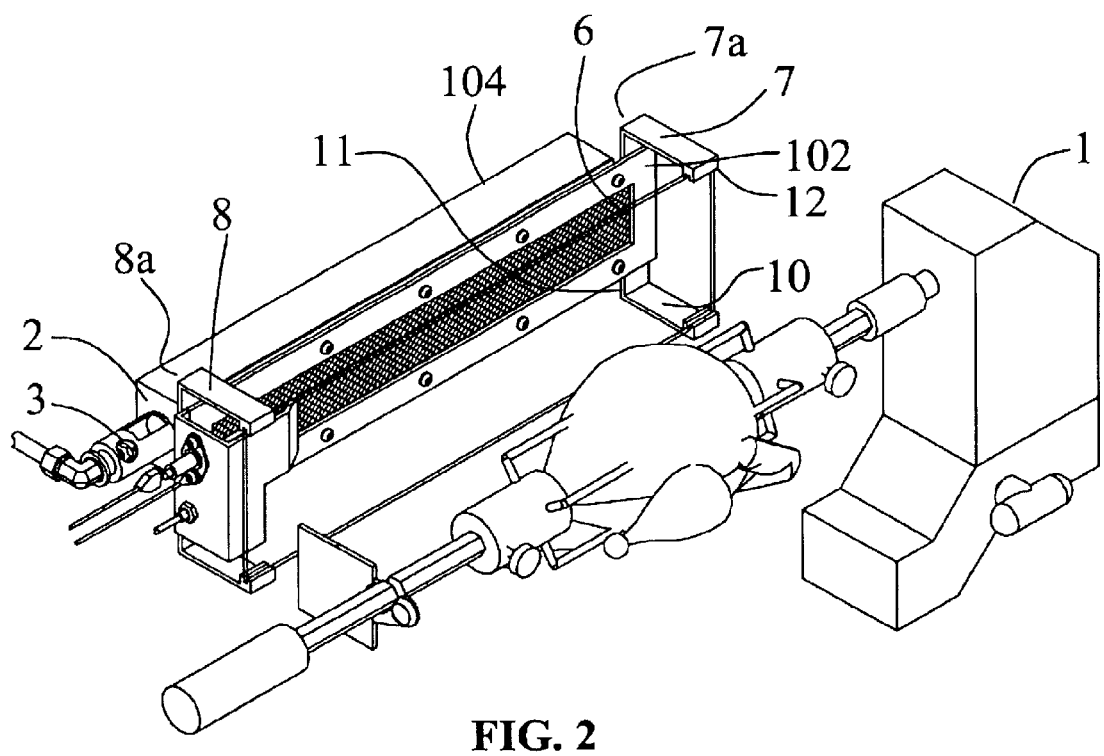
FIG. 2 is a close up view of the components of the invention showing the positioning of the rotisserie and the IR or mesh burner. Also shown is one method of supporting the cover sheet for the rotisserie
Figure 3:
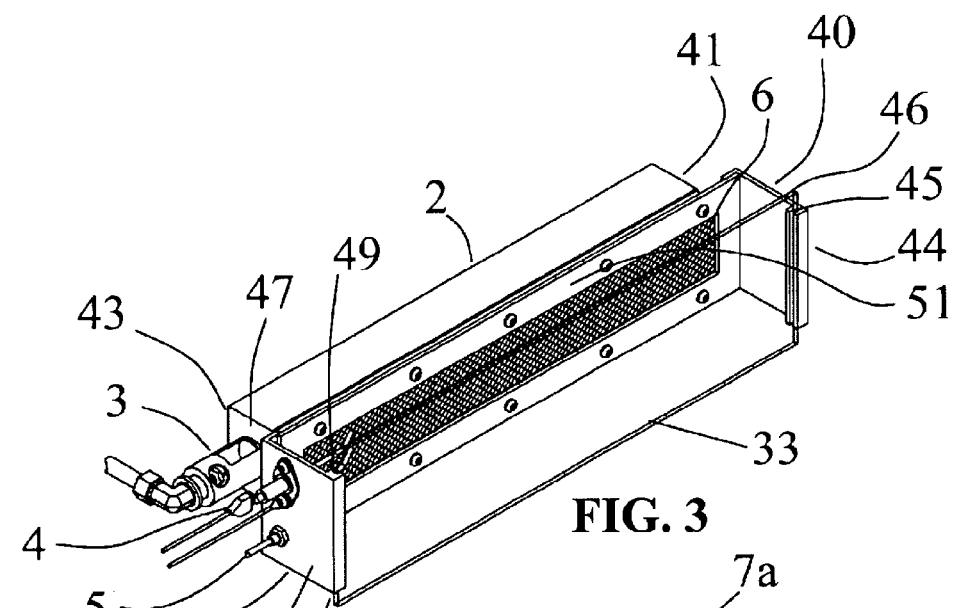
FIG. 3 shows the positioning of the rotisserie and the IR or mesh burner. Also shown is a first alternative configuration of the supports for the cover sheet.
Figure 4:
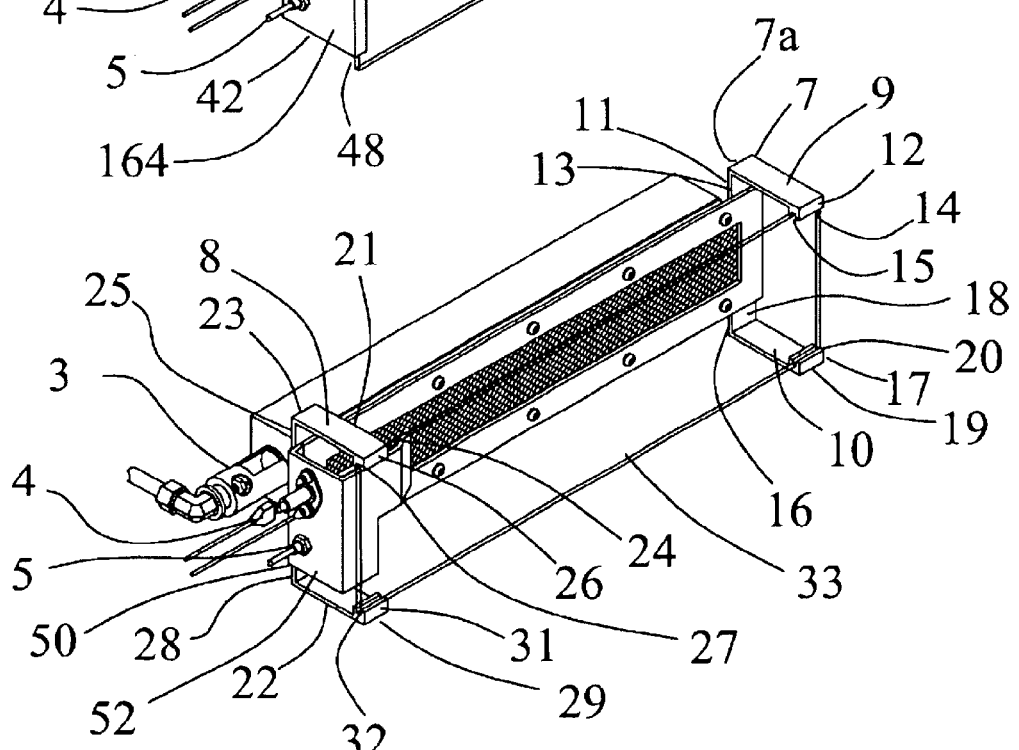
FIG. 4 shows the positioning of the rotisserie and the IR or mesh burner. Also shown is a second alternative configuration of the supports for the cover sheet.
Figure 5:
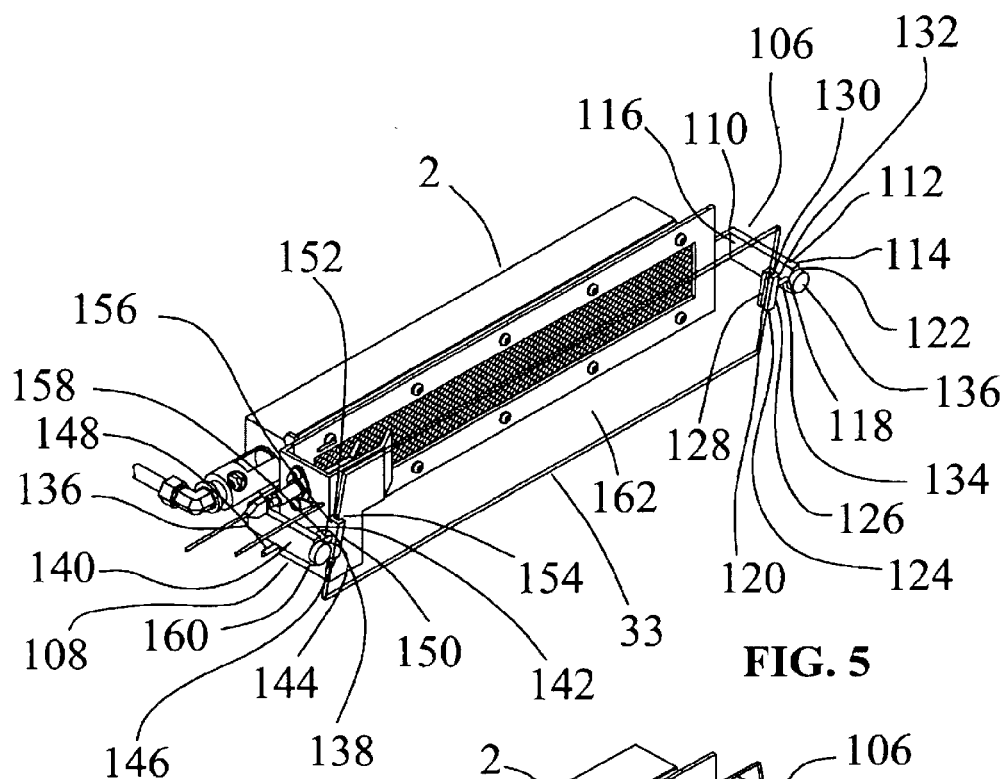
FIG. 5 shows the positioning of the rotisserie and the IR or mesh burner. Also shown is a third alternative configuration of the supports for the cover sheet.
Figure 6:
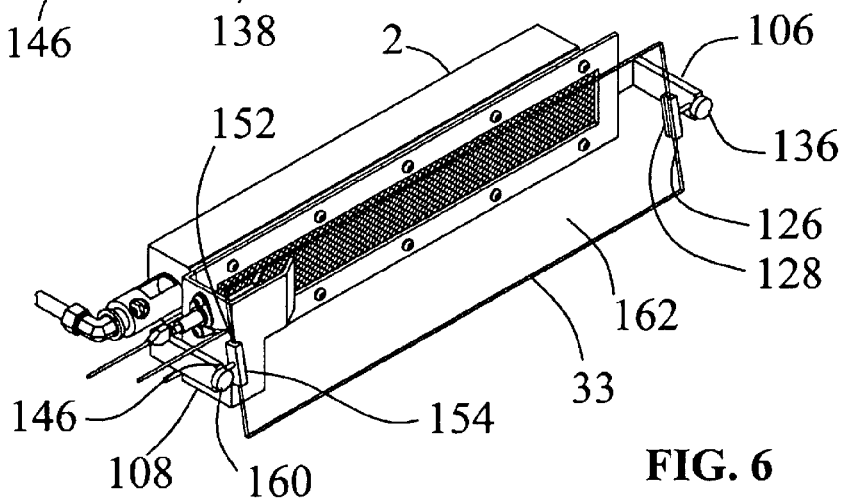
FIG. 6 shows the positioning of the rotisserie and the IR or mesh burner. showing an alternative orientation of the third alternative configuration of the supports for the cover sheet.

With respect to FIG. 1, an embodiment for a barbeque grill (100) is shown. A rotisserie (1) is shown attached to the barbeque grill (100) in a industry standard method. Mounted behind the rotisserie (1) is an IR (Infrared) or mesh burner (2). The IR burner (2) has a flammable gas inlet (3) mounted thereon. The IR burner (2) has a front side (102) and a rear side (104). The front side (102) of the IR burner (2) has a matrix of holes (6) defined therein, where the matrix of holes (6) is used to define a planar flame surface. The position of his particular IR burner (2) is shown towards the rear of a barbeque grill (100) or oven. A first support (7), is mounted to a first side (7a) of the IR burner, while a second support (8) is mounted to a second side (8a) of the IR burner.

With respect to figure two, the first support (7) has a first upper support flange (9) and first lower support flange (10). The first upper support flange (9) has a first rear side (11) and a first front side (12). The first rear side (11) has a first down turned flange (13) which is attached either to the rear of the grill, the IR burner, or the rear of the oven. The first front side (12) has a second down turned flange (14) which has a first groove (15) defined therein. The first lower support flange (10) has a first rear side (16) and a first front side (17). The first rear side (16) has a first up turned flange (18) which is attached either to the rear of the grill, the IR burner, or the rear of the oven. The first front side (17) has a second up turned flange (19) which has a second groove (20) defined therein. The first groove (15) and the second groove (20) are positioned so as to be parallel to each other. The first down turned flange (13) of first rear side (11) may be attached to the first up turned flange (18) of the first rear side (16) of the second support (7).

The second support (8) has a first upper support flange (21) and a first lower support flange (22). The first upper support flange (21) has a first rear side (23) and a first front side (24). The first rear side (23) has a first down turned flange (25) which is attached either to the rear of the grill, the IR burner, or the rear of the oven. The first front side (24) has a second down turned flange (26) which has a third groove defined therein (27). The first lower support flange (22) has a first rear side (28) and a first front side (29). The first rear side (28) has a first up turned flange (30) which is attached either to the rear of the grill, the IR burner, or the rear of the oven. The first front side (24) has a second up turned flange (31) which has a fourth groove defined therein (32). The third groove (27) and the fourth groove (32) are positioned so as to be parallel to each other. The first groove (15), the second groove (20), the third groove (31), and the fourth groove (32) are all positioned parallel to each other thereby creating a plane to easily fit a cover sheet (33) which defined as flat sheet of metal or a transparent heat resistant material. The first down turned flange (25) of first rear side (23) may be attached to the first up turned flange (30) of the first rear side (28) of the second support (8). The first support (7) and the second support (8) may be made identical to each other to minimize the costs of manufacture.

A mounting plate (52) is shown with an igniter (4), and a thermocouple (5) mounted thereon. The mounting plate (52) prevents side winds from extinguishing the flame of the IR burner as well as positioning the igniter (4) and the thermocouple (5) in proper proximity to the matrix of holes (6) in the IR burner (2) in order to ignite the flammable gas exiting the matrix of holes (6).

With respect to figure three the IR burner (2) is shown with the flammable gas inlet (3) mounted on the IR burner (2). In the front (51) of the IR burner (2), the matrix of holes (6) for the flame is located. This particular IR burner (2) is shown towards the rear of a grill or oven (not shown), with the matrix of holes (6) facing the food to be cooked. A first support (40) is shown mounted to a first side (41) of the IR burner (2), and a second support (42) is shown mounted to a second side (43) of the IR burner (2).

The first support (40) is shown with a first inward turned flange (43), where the first inward turned flange (43) is mounted to the IR burner (2). A second inward turned flange (44) is shown with a first groove (45) defined therein. The first inward turned flange (43) and the second inward turned flange (44) are attached by a first support web (46). The second support (42) is shown with a third inward turned flange (47), where the third inward turned flange (47) is mounted to the IR burner (2). A fourth inward turned flange (48) is shown with a second groove (49) defined therein. The third inward turned flange (47) and the fourth inward turned flange (48) are attached by a second support web (49). The first groove (45) and the second groove (49) are positioned parallel to each other thereby creating a plane to easily position and fixedly attach a flat sheet of a transparent or opaque heat resistant material, or cover sheet (33) therein. The second inward turned flange (43) and the fourth inward turned flange (44) are disposed between the IR burner (2) and the food to be cooked. The second inward turned flange (43) and the fourth inward turned flange (44) being aligned in a vertical relationship.

Mounted on the second support web (49) is an igniter (4), a ground wire (50), and a thermocouple (5). The igniter (4) and the thermocouple (5) being mounted in proper proximity to the matrix of holes (6) in the IR burner (2) in order to ignite the flammable gas exiting the matrix of holes (6).

With respect to figures five and six, the IR burner (2) is shown having a first support (106) and a second support (108), the first support (106) and the second support (108) being mounted on opposing ends of the IR burner (2). The first support (106) is shown having a first mounting flange (110) and a first support flange (112), where the first mounting flange (110) is oriented perpendicular to the first support flange (112). The first support flange (112) has a first side (114) and a second side (116). The first side (114) of the first support flange (112) has a first hole (118) defined therein. The first hole (118) being disposed towards a first end (120) of the first support flange (112) and penetrating through the second side (116) of the first support flange (112). The first end (120) of the first support flange (112) has a second hole (122) defined therein. The first hole (118) and the second hole (122) being cross-drilled theredefined. (the first hole and the second hole intersect each other).

A first cover sheet support (124) is shown herein having a rectangular prismatic shape (126). A first side (128) of the first cover sheet support (124) has a first groove (130)

defined therein. A second side (132) of the first cover sheet support (124) has a first cylindrical rod (134) fixedly attached thereon. The first cylindrical rod (134) is shown disposed at a medial position and perpendicular to the prismatic shape (126). The first cylindrical rod (134) is inserted through the first hole (118) of the first support (106). A threaded knob (136) is threadably inserted through the second hole (122) located on the first end (120) of the first support flange (112) and frictionally grips the first cylindrical rod (134) of the first cover sheet support (124).

The second support (108) is shown having a first mounting flange (136) and a first support flange (138), where the first mounting flange (136) is oriented perpendicular to the first support flange (138). The first support flange (138) has a first side (140) and a second side (142). The first side (140) of the first support flange (138) has a first hole (144) defined therein. The first hole (144) being disposed towards a first end (146) of the first support flange (138) and penetrating through the second side (142) of the first support flange (138). The first end (146) of the first support flange (138) has a second hole (148) defined therein. The first hole (144) and the second hole (148) being cross-drilled theredefined.

A second cover sheet support (150) is shown herein having a rectangular prismatic shape (126). A first side (152) of the second cover sheet support (150) has a first groove (154) defined therein. A second side (156) of the second cover sheet support (150) has a second cylindrical rod (158) fixedly attached thereon. The second cylindrical rod (150) is shown disposed at a medial position and perpendicular to the prismatic shape (126). The second cylindrical rod (158) is inserted through the first hole (144) of the first support (138). A second threaded knob (160) is threadably inserted through the second hole (148) located on the first end (146) of the first support flange (138) and frictionally grips the second cylindrical rod (158) of the second cover sheet support (150).

The cover sheet (33) is fixedly inserted into the first groove (130) of the first cover sheet support (124), and the first groove (154) of the second cover sheet support (150) creating a planar heat radiating surface (162) that may be positioned at an angular relationship disparate than parallel the planer flame surface of the IR burner (2).

What is claimed is:

1. A cover sheet for rotisserie burners comprising:
   a. a first support and a second support, said first support being located on a first side of an IR or a mesh burner, said second support being mounted to a second side of said mesh burner, said first support having a first upper support and a first lower support, said first upper support and said first lower support each having a first front side and a first rear side, said first front side of said first upper support having a second down turned flange said second down turned flange having a first groove defined therein, said first front side of said first lower support having a second up turned flange, said second up turned flange having a second groove defined therein, said first groove and said second groove being disposed in a parallel relationship, said first rear side of said first upper support having a first down turned flange, said first down turned flange being attached to a rear portion of the outdoor grill, said first rear side of said first lower support having a first up turned flange, said first up turned flange being attached to the rear portion of the outdoor grill;
   b. means to attach said first support and said second support to a grill, said second support having a first upper support and a first lower support, said first upper support and said first lower support each having a first front side and a first rear side, said first front side of said first upper support of said second support having a second down turned flange said second down turned flange having a third groove defined therein, said first front side of said first lower support of said second support having a second up turned flange, said second up turned flange having a fourth groove defined therein, said third groove and said fourth groove being disposed in a parallel relationship, said first rear side of said first upper support having a first down turned flange, said first down turned flange being attached to a rear portion of the outdoor grill, said first rear side of said first lower support having a first up turned flange, said first up turned flange being attached to the rear portion of the outdoor grill;
   c. said first groove, said second groove, said third groove, and said fourth groove all being disposed in a planar parallel relationship; and
   d. means to attach a cover sheet between said first support and said second support of said grill, said cover sheet being slip fit into said first groove and said second groove and said third groove and said fourth groove and being fixedly held therein.

2. The cover sheet for rotisserie burners as described in claim one(1), wherein said means to attach said cover sheet comprises:
   a. said first support having a first inward turned flange, said first inward turned flange being mounted to a rear portion of a grill, said first support having a second inward turned flange, said second inward turned flange having a first groove defined therein, said first inward turned flange and said second inward turned flange being attached to a first support web said second inward turned flange being disposed between the mesh burner and food to be cooked;
   b. a second support, said second support having a third inward turned flange, said third inward turned flange being mounted to a rear portion of a grill, said second support having a fourth inward turned flange, said fourth inward turned flange having a second groove defined therein, said third inward turned flange and said fourth inward turned flange being attached to a second support web said fourth inward turned flange being disposed between the mesh burner and food to be cooked, said first groove and said second groove being disposed in a parallel relationship creating a plane therebetween, said first groove and said second groove further being aligned in a vertical relationship; and
   c. said cover sheet being slip fit into said first groove and said second groove, said cover sheet being fixedly attached thereon.

3. The cover sheet for rotisserie burners as described in claim one(1), wherein said means to attach said cover sheet comprises:
   a. a first support and a second support, said first support and said second support being mounted on opposing ends of the IR burner, said first support having a first mounting flange and a first support flange, said first mounting flange being oriented perpendicular to said first support flange;
   b. said first support flange having a first side and a second side, said first side of said first support flange having a first hole defined therein, said first hole penetrating through said second side of said first support flange, said first hole additionally being disposed towards a first end of said first support flange, said first end of said first support flange having a second hole defined therein, said second hole and said first hole being cross-drilled theredefined;

c. said second support having a first mounting flange and a second mounting flange, said first mounting flange being oriented perpendicular to said first support flange;

d. said first support flange of said second support having a first side and a second side, said first side of said first support flange having a first hole defined therein, said first hole penetrating through said second side of said first support flange, said first hole additionally being disposed towards a first end of said first support flange, said first end of said first support flange having a second hole defined therein, said second hole and said first hole being cross-drilled theredefined;

e. a first cover sheet support, said first cover sheet support having a rectangular prismatic shape, said first cover sheet support having a first side and a second side, said first side of said first cover sheet support having a first groove defined therein, said second side of said first cover sheet support having a first cylindrical rod fixedly attached thereon, said first cylindrical rod being disposed at a medial position and perpendicular to said prismatic shape of said first cover sheet support, said first cylindrical rod is inserted through said first hole of said first support, a threaded knob is threadably inserted through said second hole located on said first end of said first support flange, said threaded knob frictionally gripping said first cylindrical rod of said first cover sheet support;

f. a second cover sheet support, said second cover sheet support having a rectangular prismatic shape, said second cover sheet support having a first side and a second side, said first side of said second cover sheet support having a first groove defined therein, said second side of said second cover sheet support having a second cylindrical rod fixedly attached thereon, said second cylindrical rod being disposed at a medial position and perpendicular to said prismatic shape of said second cover sheet support, said second cylindrical rod is inserted through said first hole of said first support flange, a second threaded knob is threadably inserted through said second hole located on said first end of said first support flange, said threaded knob frictionally gripping said second cylindrical rod of said second cover sheet support; and g. said cover sheet being fixedly inserted onto said first groove of said first cover sheet support and said first groove of said second cover sheet support creating a planar heat radiating surface, said planar heat radiating surface being angularly positioned.

\* \* \* \* \*